United States Patent [19]

Asakura et al.

[11] Patent Number: 4,752,883
[45] Date of Patent: Jun. 21, 1988

[54] METHOD FOR DIRECTING AN UP-SHIFT OPERATION FOR A VEHICLE HAVING A MANUAL TRANSMISSION

[75] Inventors: Masahiko Asakura, Tokorozawa; Noritaka Kushida, Tokyo; Katsuhisa Amano, Fujimi; Hiroshi Hasebe, Hatogaya; Tomohiko Kawanabe, Utsunomiya; Masahiro Ueda, Asaka; Takanori Shiina, Utsunomiya, all of Japan

[73] Assignee: Honda Giken Kogyo Kabushiki Kaisha, Tokyo, Japan

[21] Appl. No.: 781,042

[22] Filed: Sep. 27, 1985

[30] Foreign Application Priority Data

Sep. 28, 1984 [JP] Japan ................................ 59-203275
Aug. 16, 1985 [JP] Japan ................................ 60-180726

[51] Int. Cl.⁴ .................... B60K 41/08; G09B 19/16; G07C 5/08
[52] U.S. Cl. ................... 364/424.1; 73/117.3; 340/52 F
[58] Field of Search ............... 364/442, 424.1; 74/866; 73/117.3; 340/52 F

[56] References Cited

U.S. PATENT DOCUMENTS 4,463,427 7/1984 Bonnetain et al. ............ 364/424.1 X
4,490,790 12/1984 Shinoda ........................... 364/424.1
4,492,112 1/1985 Igarashi et al. ............... 364/424.1 X
4,539,868 9/1985 Habu ............................. 364/424.1 X
4,550,596 11/1985 Ueda ............................. 364/424.1 X
4,559,599 12/1985 Habu et al. ...................... 364/424.1
4,622,637 11/1986 Tomita et al. .................... 364/424.1

FOREIGN PATENT DOCUMENTS

2748227 6/1978 Fed. Rep. of Germany ... 364/424.1

Primary Examiner—Felix D. Gruber
Attorney, Agent, or Firm—Birch, Stewart, Kolasch & Birch

[57] ABSTRACT

A method for directing an up shift operation for a vehicle having an engine and a manual transmission generates a direction of an up-shift operation when the vehicle speed exceeds a reference speed determined for each gear position. The reference speed of a medium speed gear is varied according to the degree of acceleration at the time of the previous up-shift operation. If the up-shift operation from a low speed gear to the medium speed gear is effected while the vehicle is not accelerating rapidly, the reference speed for an up shift operation from the medium speed gear is lowered. Further, if a cruising state of the vehicle with the medium speed gear after the acceleration is continued for more than a predetermined time period, the reference speed for an up-shift operation from the medium speed gear is also lowered.

16 Claims, 9 Drawing Sheets

| SHIFT \ MODE | | | COLD (Mile/h) | HOT (Mile/h) |
|---|---|---|---|---|
| ACCELERATION | 1 → 2 | | $V_{013}=13$ | $V_{011}=8$ |
| | 2 → 3 | | $V_{023}=23$ | $V_{021}=17$ |
| | 3 ↓ 4 | ① $P_B \leq P_1$ | $V_{034}=45$ | $V_{032}=23$ |
| | | ② $P_B > P_1$ | $V_{033}=45$ | $V_{031}=30$ |
| | 4 → 5 | | $V_{043}=47$ | $V_{041}=47$ |
| CRUISE | 3 → 4 | | $V_{036}=24$ | $V_{035}=21$ |
| | 4 ↓ 5 | CRUISE AFTER ① | $V_{046}=30$ | $V_{045}=25$ |
| | | CRUISE AFTER ② | | $V_{047}=35$ |

METHOD FOR DIRECTING AN UP-SHIFT OPERATION FOR A VEHICLE HAVING A MANUAL TRANSMISSION

BACKGROUND OF THE INVENTION

1. Field of the Invention

The present invention relates to a method for directing an up-shift operation for a vehicle with a manual transmission, or in other words, a method by which a driver of the vehicle is informed of a running condition of the vehicle requiring an up-shift operation.

2. Description of Background Art

In systems for directing an up-shift operation for a vehicle having a manual transmission, a driving condition requiring an up-shift operation is judged by means of the rotational speed of the engine and the gear position, i.e. a result of detection of a currently engaged gear position. A reference speed is previsouly set for each of the gear positions. When the detected vehicle speed exceeds the reference speed corresponding to a detected gear position, an indication device, for example, a lamp is lit up so that a driver of the vehicle is informed that an up-shift operation is needed. However, in conventional systems for directing an up-shifting operation constructed in this way, a drawback has been recognized in that a desirable direction (indication) of up-shift operation is not produced on some occasions, for instance, when the manual transmission of the vehicle is of a normal type having at least three forward gear positions. More specifically, the reference speed for up-shift operation is uniformly determined according to the currently engaged gear position without regard to the degree of acceleration of the vehicle during a preceding up-shift operation. Therefore, under such a condition that the gear has been shifted from a low speed gear to a medium speed gear while the acceleration of the vehicle is not rapid, the direction of up-shift operation may not be produced even though an up-shift operation to a high speed gear is appropriate for fuel economy rather than to keep the currently engaged medium speed gear.

Further, in the operation of a five speed type of transmission, there is a case that an up-shift operation from the third gear is effected while the vehicle is accelerating rapidly, and subsequently cruising of the vehicle at a speed slightly lower than a reference speed for an up-shift operation to the fifth gear is continued. In such a case, it is desirable, in view of the fuel economy reasons, to up-shift the transmission to the fifth gear rather than to keep the cruising state with the fourth gear.

OBJECT AND SUMMARY OF THE INVENTION

An object of the present invention is therefore to provide a control method of a system for directing an up-shift operation which is free from the drawbacks of the conventional technique, and is capable of directing an up-shift operation appropriate for improving the fuel consumption characteristic.

Another object of the present invention is to provide a method for directing an up-shift operation in which an economic operation of the vehicle is enabled by appropriately generating a direction of an up-shift operation when a cruising state with a medium speed gear is continued after an up-shift operation from a low speed gear to the medium speed gear effected while the vehicle is accelerating rapidly.

According to the present invention, a control method of a system for directing an up-shift operation is characterized by steps for detecting an up-shift operation from a low speed gear to a medium speed gear, and if a preceding up-shift operation has been effected when the vehicle is not accelerating rapidly, a reference vehicle speed for up-shift operation during the engagement of a medium speed gear is made lower than a level for a state where the preceding up-shift operation has been effected when the vehicle is accelerating rapidly.

According to another aspect of the invention, whether or not the cuising state (a state in which the vehicle is driven substantially at a constant speed) is continued for a predetermined time period after a rapid acceleration with the medium speed gear is detected, when an up-shift operation from a low speed gear to the middle speed gear effected while the vehicle is accelerated rapidly is detected. If the cruising state has been continued for more than the predetermined time period, a reference speed level for an up-shift operation from the medium speed gear is made lower than a usual reference speed level.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2A through 2D, when combined, are a flowchart showing steps of an embodiment of the method according to the present invention;

FIG. 5 is a figure showing the manner in which FIGS. 2A and 2B are combined.

DETAILED DESCRIPTION OF PREFERRED EMBODIMENTS

Figure 1:
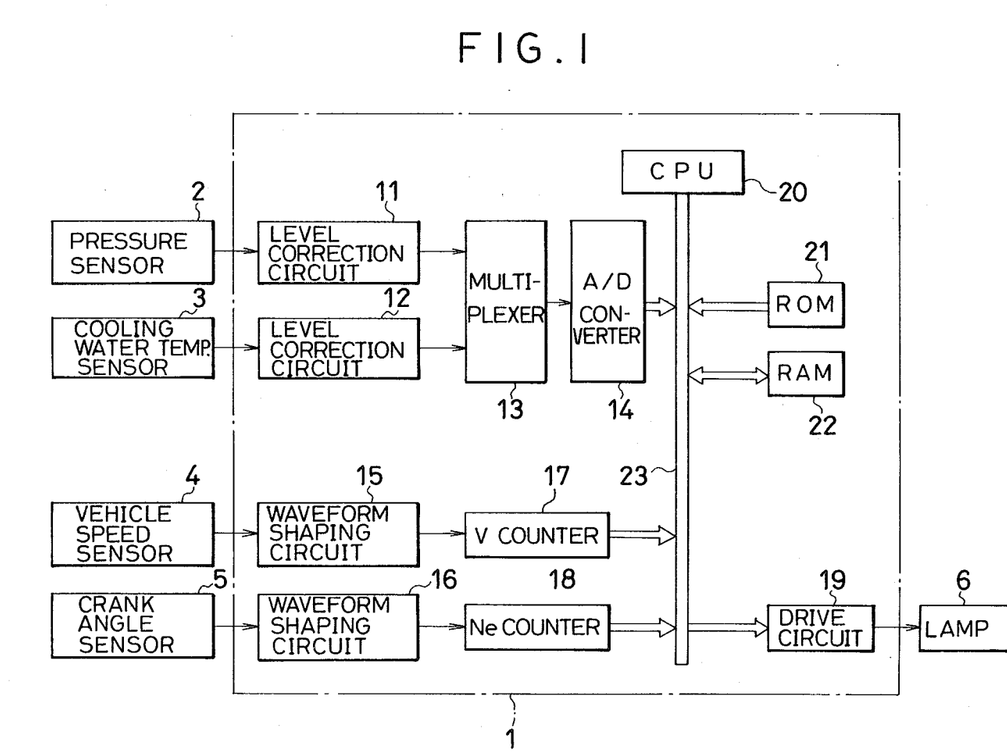
FIG. 1 is a block diagram of a system for directing an up-shift operation, in which the method according to the present invention is suitably effected.

Reference is first made to FIG. 1 wherein the construction of a system for directing an up-shift operation is shown in which a method according to the present invention is applied. The system includes a control circuit 1 which comprises a microcomputer. The control circuit 1 receives various sensor output signals, from a pressure sensor 2, a cooling water temperature sensor 3, a crank angle sensor 5 which are connected to an internal combustion engine mounted on the vehicle, and a vehicle speed sensor 4. The pressure sensor 2 produces an output voltage whose level corresponds to the magnitude of pressure in an intake manifold of the engine, on the downstream side of the throttle valve. The cooling water temperature sensor 3 produces an output voltage whose level corresponds to the temperature of the cooling water of the engine. The vehicle speed sensor 4 produces an angular position signal whose period is inversely proportional to the rotational speed of an output shaft of a manual transmission of the vehicle. The crank angle sensor 5 generates an angular position signal whose period is inversely proportional to the rotational speed of a crankshaft of the engine. A lamp 6 for indicating the necessity of an up-shift operation is also connected to the control circuit 1.

The control circuit 1 includes level correction circuits 11 and 12 for correcting levels of signals from the pressure sensor 2 and the cooling water temperature sensor 3. Output signals of the level correction circuits 11 and 12 are then supplied to a multiplexer 13 which transmits either one of the output signals of the level correction circuits 11 and 12. An analog output signal of the multiplexer 13 is in turn supplied to an A/D (analog to digital) converter 14 for converting the analog signal from the multiplexer 13 to a digital signal. The control circuit 1 further includes waveform shaping circuits 15 and 16 respectively for shaping the waveform of the angular position signals from the vehicle speed sensor 4 and the crank angle sensor 5 to square wave pulse signals. An output pulse signal of the waveform shaping circuit 15 is in turn supplied to a V counter 17 which measures intervals of output pulses of the waveform shaping circuit 15 by counting the number of predetermined clock pulses and producing a digital signal indicative of a value inversely proportional to the vehicle speed. On the other hand, an output signal of the waveform shaping circuit 16 is supplied to an $N_e$ counter 18 for measuring intervals of pulses of the output signal of the waveform shaping circuit 16 by counting the number of predetermined clock pulses and producing a digital signal indicative of a value inversely proportional to the rotational speed of the engine. The control circuit 1 further includes a drive circuit 19 for driving the lamp 6, a CPU (central processing unit) 20, a ROM 21 for storing various programs and data, and a RAM 22. The A/D converter 14, the counters 17, 18, the drive circuit 19, the CPU 20, the ROM 21, and the RAM 22 are mutually connected via an I/0 (input/output) bus 23.

Further, a plurality of timers $T_{150}$, $T_{150'}$, $T_{ONE}$, $T_{2nd}$ and $T_{CL}$ are incorporated in the CPU 20, which timers take the form of down counters constructed to start down counting when a set signal is applied thereto.

In the thus constructed system, information as to the pressure $P_B$ in the intake manifold and the temperature $T_W$ of the cooling water from the A/D converter 14, is selectively supplied to the CPU 20 through the I/O bus 23. Also, information of the engine speed $N_e$ and the vehicle speed V from the $N_e$ counter 18 and the V counter 17 respectively are supplied to the CPU 20 via the I/0 bus 23.

The CPU 20 reads the above mentioned various information according to a program stored in the ROM 21. On the basis of this information, the CPU 20 determines whether or not the up-shift is necessary, using the method according to the present invention. When the necessity of an up-shift operation is determined, a lamp drive command signal is supplied to the drive circuit 19.

Referring now to the flowchart of FIGS. 2A through 2D, the operational sequence of the control method according to the present invention will be explained hereinafter.

In this sequence of operations, the pressure $P_B$ in the intake manifold, the cooling water temperature $T_W$, the vehicle speed V, and the engine rotational speed Ne are read and stored in the RAM 22, at a step 51. Then, whether or not the pressure $P_B$ in the intake manifold is greater than a predetermined level $P_1$ ($-150$ mmHg for example) is detected at a step 52. If the pressure $P_B$ is equal to or below the predetermined pressure $P_1$, i.e., on the vacuum side, the timer $T_{150'}$ is set at an initial set value corresponding to a predetermined time period ta (2.5 seconds, for example), at a step 53. If $P_B > P_1$, i.e., on the atmospheric pressure side, it is regarded that the vehicle is accelerating rapidly. In this case, whether or not the count value of the timer $T_{150'}$ is equal to 0 is detected at a step 54 so as to determine whether or not the condition of $P_B > P_1$ has been continued for the predetermined time period ta. If $T_{150'} = 0$, whether or not a flag A indicating a gear position is equal to 1 is detected at a step 55. If the flag A is 1, it indicates that the acceleration of the vehicle has been effected with the engagement of a third gear. If, on the other hand, $A \neq 1$, whether or not the third gear position is established is detected at a step 56. If the third gear is established, the flag A is made equal to 1 at a step 57. If the third gear is not established, the flag A is made equal to 0, at a step 58. On the other hand, after the set of the timer $T_{150'}$ at the step 53 or if $T_{150'} \neq 0$ is detected at the step 54, whether or not the flag A is equal to 1 is detected at a step 59. When the flag A = 1 is detected at the step 55 or 59, or after the set of flag A at the step 57 or 58, whether or not a flag $F_{ONE}$ indicating that any of the third through fifth gears have been engaged one time is set to 1 is detected at a step 60. If $F_{ONE} \neq 1$ due to the execution of the main routine until the last cycle of calculation, whether or not the third gear is engaged is detected at a step 61. If the third gear is not engaged, whether or not the fourth gear is engaged is detected at a step 62. If the fourth gear is not engaged, whether or not the fifth gear is engaged is further detected at a step 63. If the fifth gear is not engaged, it is regarded that either one of the first and second gears is engaged or the gear is in a neutral position, and the timer $T_{ONE}$ is set at a second predetermined value corresponding to a predetermined time period tb (1.5 seconds, for example) at a step 64. After the setting, a value 0 is set for the flag $F_{ONE}$ at a step 65. On the other hand, when it is detected that any of the third through fifth gears is engaged, at the step 61, 62, or 63, whether or not the count value of the timer $T_{ONE}$ is equal to 0 is detected at a step 66 so as to determine whether or not any of the third through fifth gears had been engaged for the predetermined time period tb. If $T_{ONE} \neq 0$ a value 0 is set for the flag $F_{ONE}$ at the step 65, in like manner as the case where the first or second gear is engaged, or the gear is in the neutral position. After the step 65, a timer $T_{2nd}$ is set at a third predetermined value corresponding to a predetermined time period tc (2.5 seconds, for example), at a step 67 and whether or not the vehicle speed V is equal to or below a predetermined speed $V_1$ (6 miles/h, for example) is detected at a step 68. On the other hand, if $T_{ONE} = 0$ at the step 66, a value 1 is set for the flag $F_{ONE}$ at a step 69, and whether or not the second gear is engaged is detected at a step 70. This detection is also effected when $F_{ONE} = 1$ is detected at the step 60, that is, when it has been already detected during the execution of the main routine until the last cycle, that any of the third through fifth gears are engaged. If the second gear is not engaged, the operation of the step 67 is performed and if the second gear is engaged, whether or not the count value $T_{2nd}$ of the timer $T_{2nd}$ is equal to 0 is detected at a step 71 so as to detect whether or not the predetermined time period tc has passed after the gear has been down shifted to the second gear. If $T_{2nd}\neq 0$, the operation of the step 68 is effected. If any of the conditions $V \leq V_1$ in the step 68, $T_{2nd}=0$ at the step 71, and $A \neq 1$ at the step 59 is detected, the value 0 is set for the flag A and for the flag $F_{ONE}$ at a step 72. After the execution of the step 72, or when the condition $V>V_1$ is detected at the step 68, whether or not any of the first through fourth gears is engaged is detected at a step 73. If any of the first through fourth gears are engaged, whether or not a subtraction value $\Delta V$, which is obtained by subtracting a preceding value of the vehicle speed from a latest value of the vehicle speed, is greater than a predetermined value $V_2$ (0.5 miles/h, for example) is detected at a step 74. If $\Delta V \geq V_2$, it means that the vehicle is accelerating, and whether or not the pressure $P_B$ in the intake manifold is greater than the predetermined value $P_1$ is detected at a step 75. IF $P_B>P_1$, the timer $T_{150}$ is set at a fourth predetermined value corresponding to a predetermined time period td (2.0 seconds, for example) at a step 76. After the step 76, whether or not a flag $F_{T75}$ indicating the high or low state of the cooling water temperature is equal to 1 is detected at a step 77. A value 0 is set for the flag $F_{T75}$ when the cooling water temperature $T_W$ is equal to or above a predetermined level (75° C. for example) and a value 1 is set for the flag $F_{T75}$ when the cooling water temperature $T_W$ is below the predetermined level. If $F_{T75}=0$ at the step 77, it is regarded that the vehicle is accelerating rapidly in a HOT mode, and data values $V_{011}$, $V_{021}$, $V_{031}$, $V_{041}$ are in turn set as reference speed levels $V_{01}$, $V_{02}$, $V_{03}$, $V_{04}$, respectively, for the first through fourth gears, at a step 78. If $F_{T75}=1$, it is regarded that the vehicle is accelerating rapidly in a COLD mode, and data values $V_{013}$, $V_{023}$, $V_{033}$, $V_{043}$ are in turn set as the reference speed levels $V_{01}$, $V_{02}$, $V_{03}$, $V_{04}$, at a step 79. On the other hand, if $P_B \leq P_1$ at the step 75, it means that the vehicle is accelerating slowly and whether or not the count value of the timer $T_{150}$ is equal to 0 is detected at a step 80 so as to detect whether or not the slow acceleration of the vehicle has been continued for the predetermined time period td. If $T_{150}=0$, the operation of the step 77 is executed since the vehicle may be accelerated rapidly. If $T_{150}\neq 0$, whether or not the flag $F_{T75}$ is equal to 1 is detected at a step 81. If $F_{T75}=0$, it is regarded that the vehicle is accelerating slowly in the HOT mode, and data values $V_{012}$, $V_{022}$, $V_{032}$, $V_{042}$ are in turn set as the reference speed levels $V_{01}$, $V_{02}$, $V_{03}$, $V_{04}$, at a step 82. If $F_{T75}=1$, it is regarded that the vehicle is accelerating slowly in the COLD mode, and data values $V_{014}$, $V_{024}$, $V_{034}$, $V_{044}$ are in turn set as the reference speed levels $V_{01}$, $V_{02}$, $V_{03}$, $V_{04}$, at a step 83.

If a condition $\Delta V<V_2$ is detected at the step 74, whether or not an absolute value $|\Delta V|$ is equal to or smaller than $V_2$ is detected at a step 84. If $|\Delta V| \leq V_2$, it means that the vehicle is running under a "cruising" condition, and whether or not the pressure $P_B$ in the intake manifold is above the predetermined pressure $P_1$ is detected at a step 85. If $P_B>P_1$, it is regarded that the vehicle may be accelerated and the timer $T_{150}$ is set at the fourth predetermined value at a step 86. After that, whether or not the flag $F_{T75}$ is equal to 1 is detected at the step 81, in a manner similar to the case of the slow acceleration. If $P_B \leq P_1$ at the step 85, whether or not the count value $T_{150}$ of the timer $T_{150}$ is equal to 0 is detected at a step 87 so as to detect whether or not the cruising state has been continued for the predetermined time period td. If $T_{150}\neq 0$, the operation of the step 81 is executed in consideration of the possibility of the acceleration. If $T_{150}=0$, whether or not the flag $F_{T75}$ is equal to 1 is detected at a step 88. If $F_{T75}$ is equal to 1, it is regarded that the vehicle is cruising in the COLD mode, and data values $V_{016}$, $V_{026}$, $V_{036}$, $V_{046}$ are in turn set as the reference speed levels $V_{01}$, $V_{02}$, $V_{03}$, $V_{04}$, at a step 89. If $F_{T75}=0$, it is regarded that the vehicle is cruising in the HOT mode, and data values $V_{015}$, $V_{025}$, $V_{035}$ are in turn set as the reference speed levels $V_{01}$, $V_{02}$, $V_{03}$, at a step 90. Then, whether or not the flag A is equal to 1 is detected at a step 91. If the flag $A=0$, it means that the vehicle has not been accelerated rapidly with the third gear and a data value $V_{045}$ is set for the reference speed level $V_{04}$ of the fourth gear, at a step 92. If $A=1$, it means that the vehicle has been accelerated rapidly with the third gear, and a data value $V_{047}$ which is larger than the data value $V_{045}$ is set for the reference speed level $V_{04}$ of the fourth gear, at a step 93.

After the reference speed levels $V_{01}$ through $V_{04}$ for the first through fourth gears have been determined in this way, whether or not the first gear is engaged is detected at a step 94. If the first gear is engaged, whether or not the vehicle speed V is greater than the reference speed level $V_{01}$ of the first gear is detected at a step 95. If $V>V_{01}$, it is determined that the vehicle is running under a condition requiring an up-shift operation to the second gear, and a lamp drive signal is generated so that the lamp 6 is lit up by the drive circuit 19, at a step 96. If $V \leq V_{01}$, it is determined that the vehicle operation has not reached the condition requiring the up-shift operation to the second gear, and the drive of the lamp 6 is stopped at a step 97. If it is detected, at the step 94, that the first gear is not engaged, whether or not the second gear is engaged is detected at a step 98. If the second gear is engaged, whether or not the vehicle speed V is greater than the reference speed level $V_{02}$ of the second gear is detected at a step 99. If $V>V_{02}$, it is determined that the vehicle operation is under a condition requiring an up-shift operation to the third gear, and the operation of the step 96 is effected to turn on the lamp 6. If, on the other hand, $V \leq V_{02}$, it is determined that the vehicle operation has not reached the condition requiring the up-shift operation to the third gear, and the operation of the step 97 is effected to stop the drive of the lamp 6. Similarly, if, at the step 98, it is detected that the second gear is not engaged, whether or not the third gear is engaged is detected at a step 100. If the third gear is engaged, whether or not the vehicle speed is above the reference speed level $V_{03}$ of the third gear is detected at a step 101. If $V>V_{03}$, it is determined that the vehicle operation is under a condition requiring an up-shift operation to the fourth gear, and the lamp is turned on at the step 96. If, on the other hand, $V \leq V_{03}$, it is determined that the vehicle operation has not reached the condition requiring the up-shift opration to the fourth gear, and the drive of the lamp 6 is stopped. If it is detected, at the step 100, that the third gear is not engaged, whether or not the fourth gear is engaged is further detected at a step 102. If the fourth gear is engaged, whether or not the vehicle speed V is above the reference speed level $V_{04}$ of the fourth gear is detected at a step 103. If $V > V_{04}$, it is determined that the vehicle operation is under a condition requiring an up-shift operation to the fifth gear, and operation of the step 96 to turn on the lamp 6. If, on the other hand, $V \leq V_{04}$, it is determined that the vehicle operation has not reached the condition requiring the up-shift operation to the fifth gear, and the operation of the step 97 is effected to stop the driving of the lamp 6. If it is detected, at the step 102, that the fourth gear is not engaged, the operation of the step 97 is effected to turn off the lamp 6.

If it is detected, at the step 73, that none of the first through fourth gears is engaged, it means that the gear position is in the fifth gear or in the neutral position. Therefore, the operation of the step 97 is effected to stop the driving of the lamp 6 since the up-shift operation is not required in this state. The operation of the step 97 is also effected if a state $|\Delta V| > V_2$ is detected at the step 84, when the vehicle is decelerating.

Figure 3:
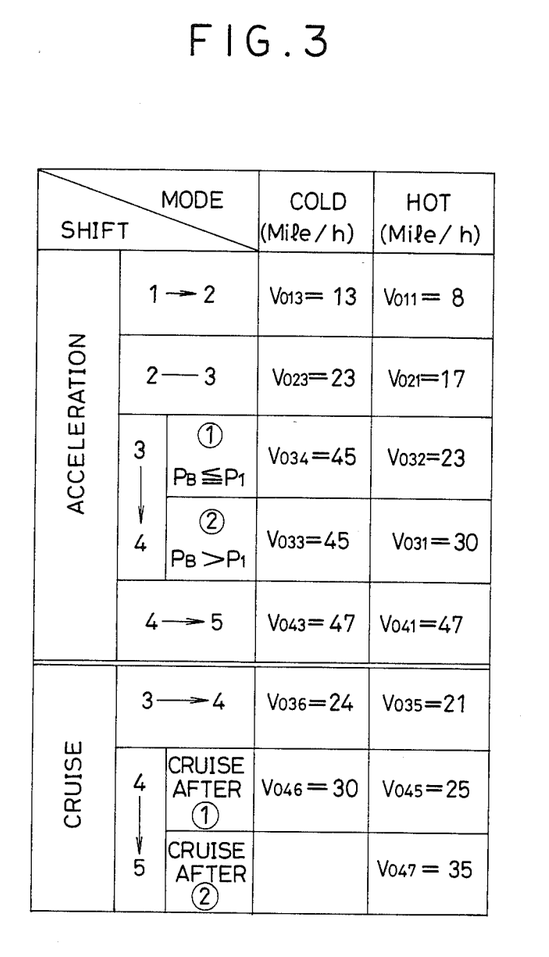
FIG. 3 is a table indicating reference speed levels for the up-shift operation used in the method shown in FIGS. 2A through 2D, 2E, and 2F.

As will be appreciated from the foregoing, according to the method for directing an up-shift operation according to the present invention, the reference speed level for each gear position is determined differently depending on the HOT or COLD mode and further depending on the accelerating state or the cruising state, as summarized in FIG. 3 which also shows exemplary actual values of reference speed levels. For instance, if the vehicle is accelerating rapidly with the third gear in the HOT mode, the reference speed level for the up-shift operation to the fourth gear is set at 30 miles/h. In addition, if the vehicle is cruising after the up-shift operation to the fourth gear, the reference speed level for the up-shift operation to the fifth gear is set at 35 miles/h. On the other hand, if the vehicle is accelerating slowly with the third gear in the HOT mode, the reference speed level for the up-shift operation to the fourth gear is lowered to a value of 23 miles/h, and the reference speed level to the fifth gear in the subsequent cruising state is also lowered to a value of 25 miles/h.

Figures 2A, 5:
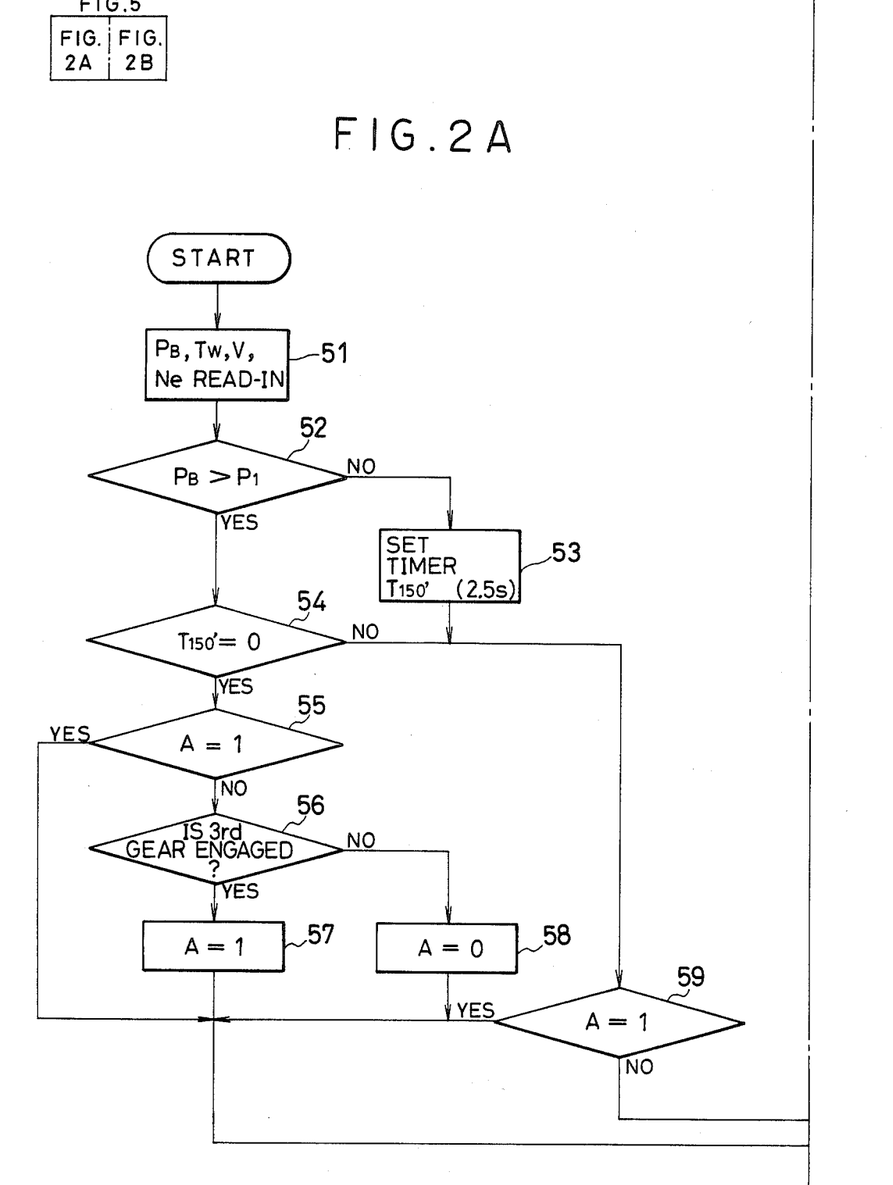
Figure 2B:
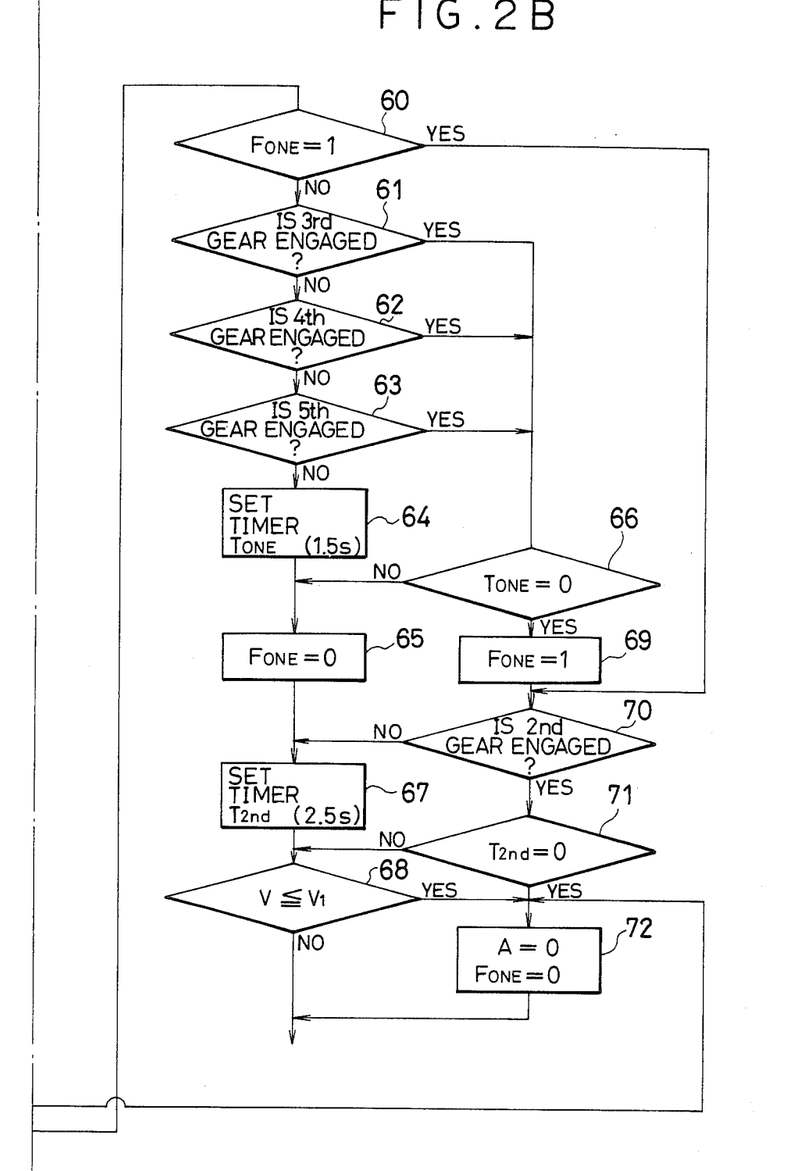
Figure 2C:
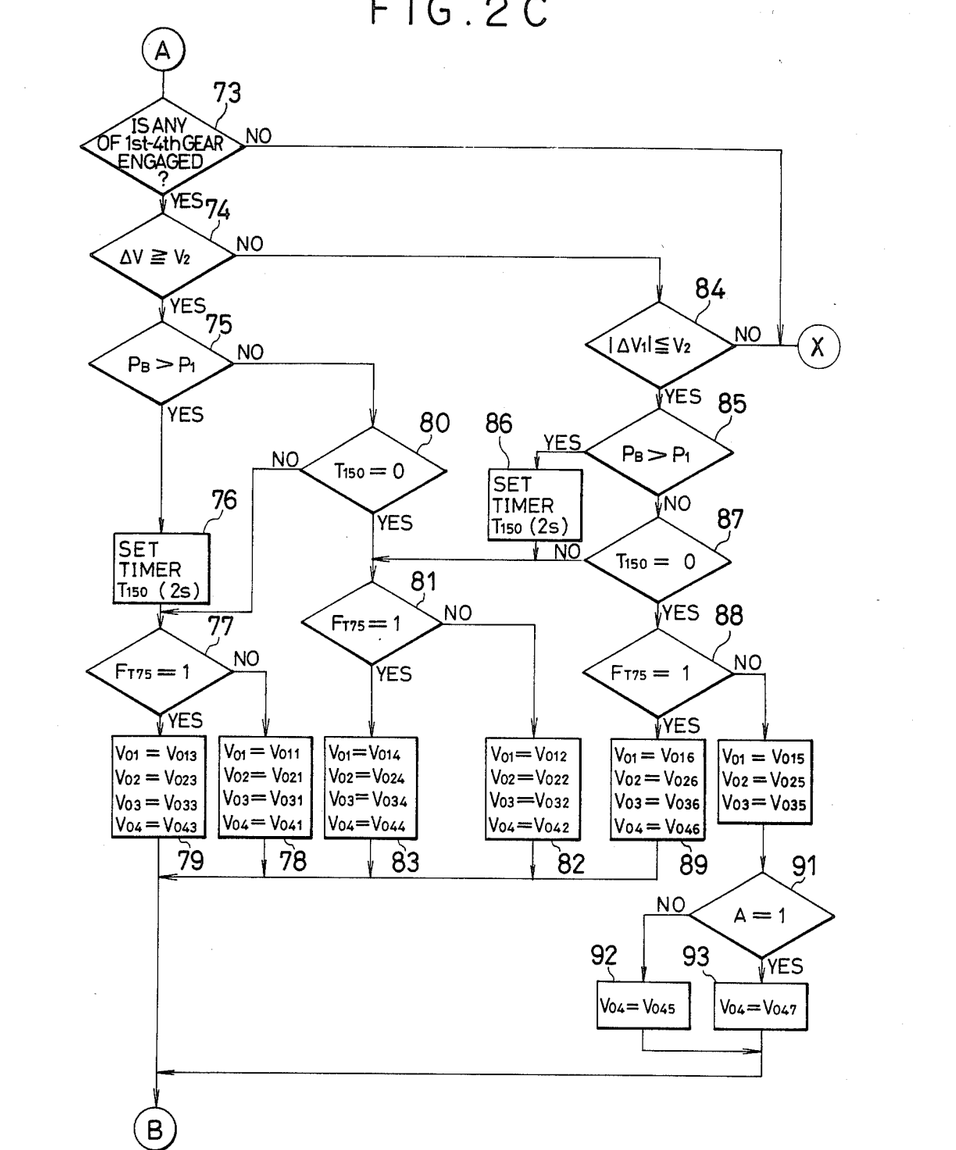
Figure 2D:
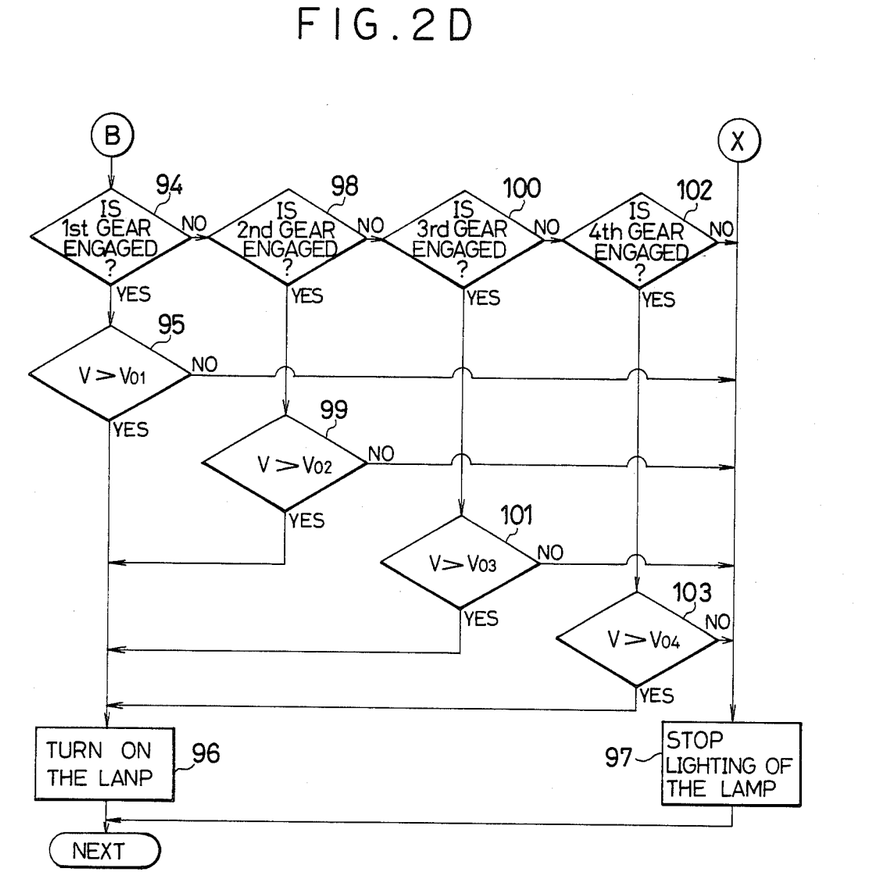
Figure 2E:
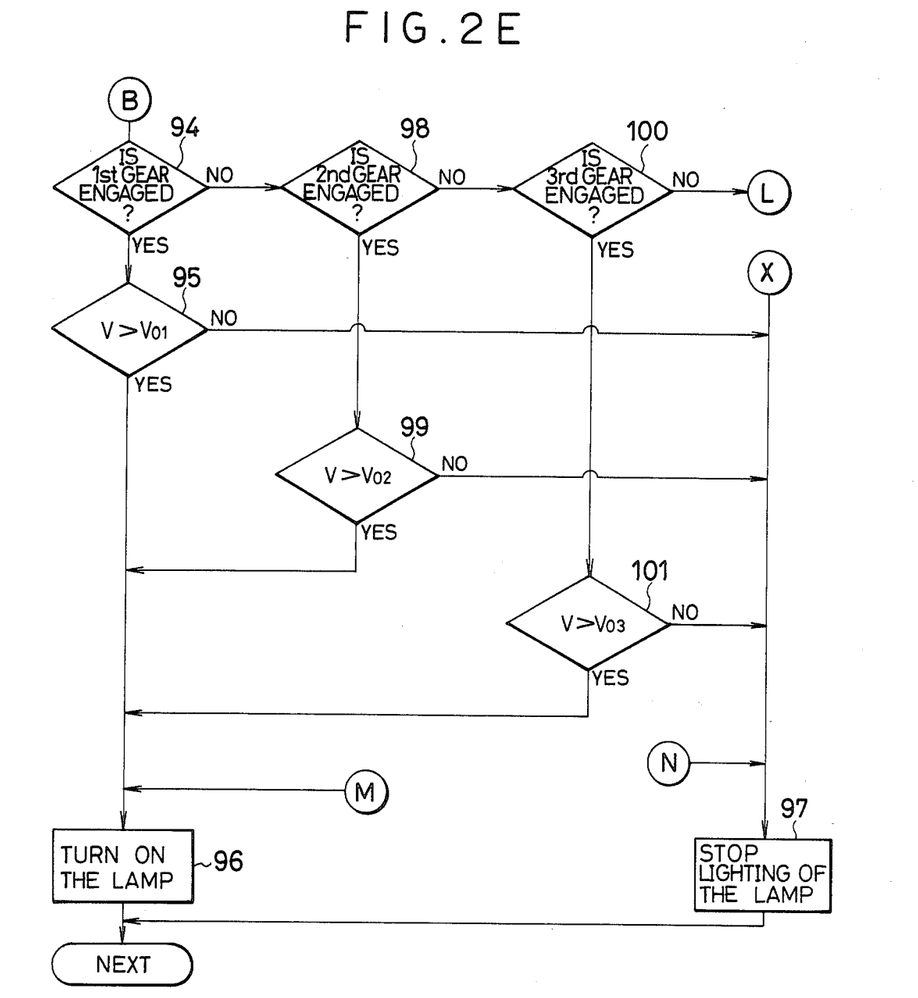
FIGS. 2E and 2F, when combined, are a flowchart showing a part of steps of a second embodiment of the method according to the present invention.
Figure 2F:
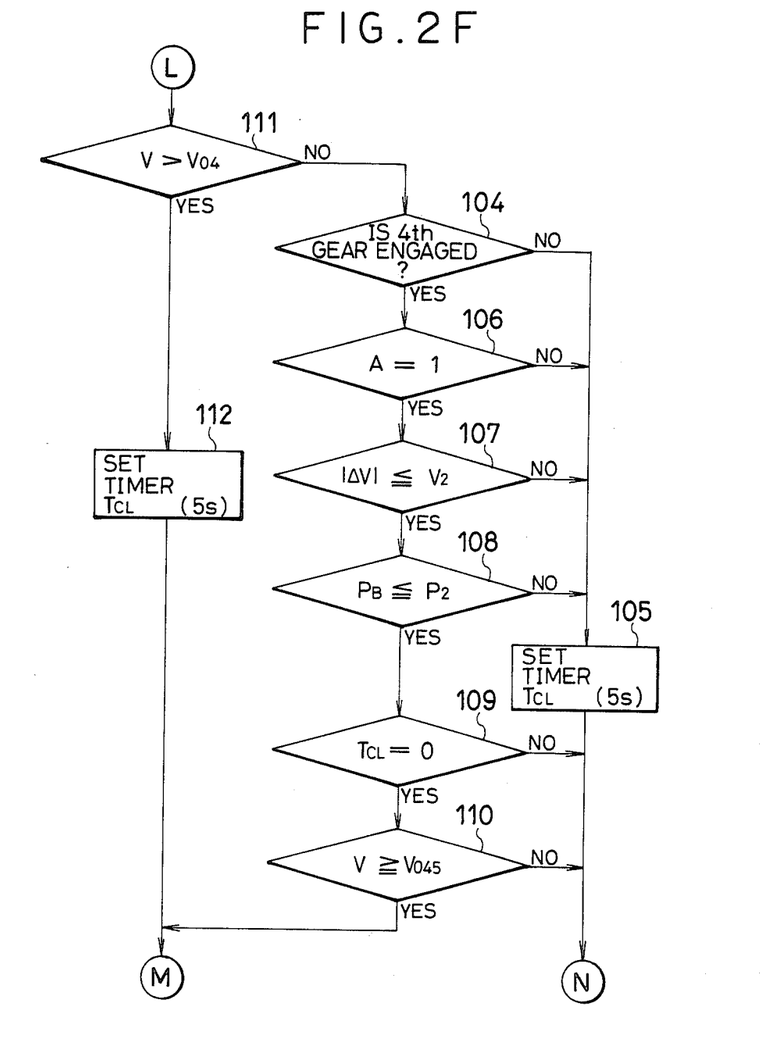

Referring to the flowchart of FIGS. 2E and 2F, the second embodiment of the present invention will be explained. FIGS. 2E and 2F correspond to FIG. 2D of the previous embodiment and the operations of the steps 94 through 99, and the step 101 are the same as those of the previous embodiment.

If, at the step 100, it is detected that the third gear is not engaged, whether or not the vehicle speed V is higher than the reference speed level $V_{04}$ of the fourth gear is detected at a step 111. If $V > V_{04}$, a fifth predetermined value corresponding to a predetermined time period te (5 seconds for example) is set in the timer $T_{CL}$, at a step 112. At the same time, it is determined that the vehicle is running under a condition requiring an up-shift operation to the fifth gear, and the operation of the step 96 is effected to turn on the lamp 6. If $V \leq V_{04}$, whether or not the fourth gear is engaged is detected at a step 104. If the fourth gear is not engaged, the fifth predetermined value is set in the timer $T_{CL}$ at a step 105, and the operation of the step 97 is effected to stop the driving of the lamp 97. If the fourth gear is engaged, whether or not the flag A for determining the rapid acceleration with the third gear is equal to 1 is detected at a step 106. If $A=1$, it means that the up-shift operation from the third gear to the fourth gear is effected while the vehicle is accelerating rapidly. If $A=1$ the operation of the step 105 is effected. Then, whether or not the absolute value of the difference $\Delta V$ obtained by subtracting the previous vehicle speed value from the latest vehicle speed value is equal to or smaller than the predetermined value $V_2$ is detected at a step 107. If $\Delta V > V_2$, it means that the vehicle is accelerating, and the operation of the step 105 is effected. If $|\Delta V| \leq V_2$, it means that the vehicle is cruising, and whether or not the pressure $P_B$ in the intake manifold is equal to or lower than a predetermined pressure $P_2$ ($-460$ mmHg for example) is detected at a step 108. This predetermined pressure $P_2$ is determined to vary in response to a result of a previous execution of the step 108 so as to have a hysteresis characteristic. If $P_B > P_2$, it is regarded that the cruising state of the vehicle can not be maintained, and the operation of the step 105 is effected. If, on the other hand, $P_B \leq P_2$, it is regarded that the cruising state of the vehicle will be continued, and whether or not the count value $T_{CL}$ of the timer $T_{CL}$ is equal to 0 is detected at a step 109. If $T_{CL} \neq 0$, it means that the cruising state of the vehicle has not continued for the predetermined time period te. Therefore, it is determined that the operation of the vehicle has not reached a condition for up-shift operation to the fifth gear, and the operation of the step 97 is effected. If $T_{CL}=0$, it means that the cruising state of the vehicle has been continued for more than the predetermined time period te, and the data value $V_{045}$ is used as the reference speed level $V_{04}$ of the fourth gear even though the up-shift operation from the third gear has been effected while the vehicle is accelerating rapidly. Then, whether or not the vehicle speed V is equal to or higher than the reference speed $V_{045}$ is detected at a step 110. If $V \geq V_{045}$, it is determined that the vehicle is in a state for the up-shift operation to the fifth gear, and the operation of the step 96 is effected to turn on the lamp 6. If, on the other hand, $V < V_{045}$, it is determined that the vehicle operation is not in a state for the up-shift operation, and the operation of the step 97 is effected to stop the driving of the lamp 6.

In this embodiment, the reference speed levels shown in FIG. 3 are also utilized.

Figure 4:
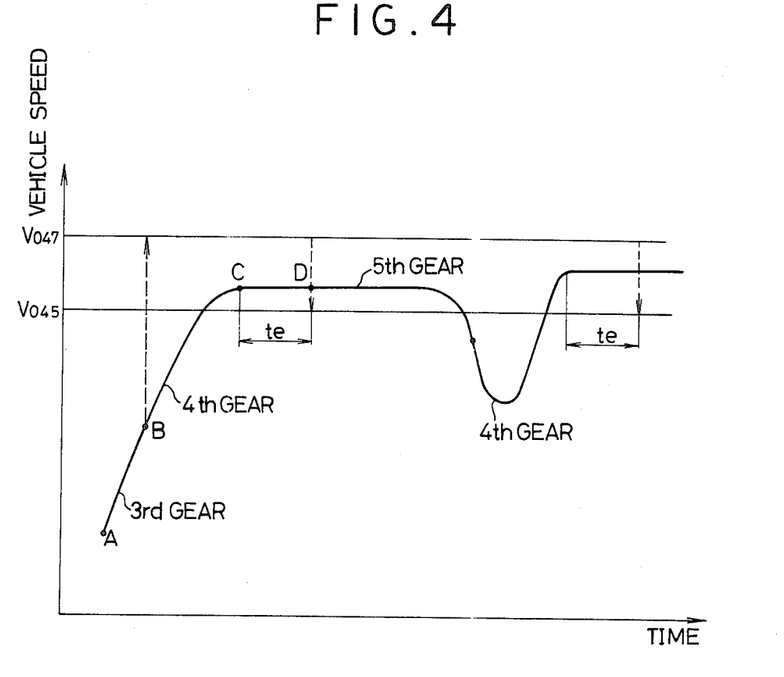
FIG. 4 is a graph showing an example of operation of a vehicle in which the method according to the present invention is applied.

Referring to FIG. 4, an example of vehicle operation according to this embodiment will be explained. It is assumed, the acceleration of the vehicle, which is detected by a condition of $P_B > P_1$, with the third gear has been continued during a period from a time A to a time B, and an up-shift operation from the third gear to the fourth gear is effected at the time B. In this state, the data value $V_{047}$ is used for the reference speed level $V_{04}$ for the up-shift operation to the fifth gear. Subsequently, the vehicle enters into a cruising state with the fourth gear at a speed higher than the reference speed level $V_{045}$ for the up-shift operation from the fourth gear to the fifth gear to be used while the vechicle is not accelerating rapidly. If this cruising state has been continued for the predetermined time period te from the time C of the start of the cruising state, the reference speed level for the up-shift operation is changed from the value $V_{047}$ to the value $V_{045}$ lower than the value $V_{047}$, at a time D. Therefore, at the time D, the lamp 6 for directing the up-shift operation is turned on to inform the driver that the vehicle is operating under a condition requiring an up-shift operation. Subsequently, if the speed of the vehicle falls, a down-shift operation to the fourth gear is effected by the driver and the above explained operations will be repeated.

In the above embodiments, the detection of the gear position of the manual transmission system is performed by using a ratio $V/N_e$ between the vehicle speed V and the rotational speed of the engine Ne, since this ratio falls within one of different ranges depending on the gear position. However, it is also possible to use a plurality of switches provided for directly detecting that the shift lever is moved into each shift position.

Further, operations in the case of a five speed type transmission gear have been explained in the above embodiments, in which the third gear is treated as the low speed gear. However, it is also possible to treat the first or second gear as the low speed gear. If the first gear is treated as the low speed gear, the flag A is to be made equal to 0 only when the vehicle stands still. Further, it is needless to say that the method of the present invention can be applied to more than one gear position at the same time, for the purpose of promoting further fuel economy.

Thus, according to the present invention, in the case where an up-shift operation from a low speed gear to a medium speed gear has been effected while the vehicle is not accelerating rapidly, the reference speed level for an up-shift operation from a medium speed gear to a high speed gear is made lower than a level in a case where the up-shift operation has been effected while the vehicle is accelerating rapidly. Thus, the up-shift operation is made earlier to promote fuel savings.

Further, in view of the fact that an up-shift operation under a rapid acceleration condition of the vehicle is usually almost limited to a state of acceleration after a start of the vehicle, and subsequently to a very limited state such as an acceleration for passing another vehicle, if an up-shift operation from the third gear is effected when the vehicle is accelerating slowly, it is possible to continuously designate an economic driving condition assuming that the traffic environment allows the vehicle to be driven economically. On the contrary, rapid acceleration of the vehicle occurs mainly under city traffic condition. Therefore, under such a condition, the shift points suited for keeping the driveability of the vehicle are continously obtained.

In addition, according to the second embodiment of the present invention, a direction of up-shift operation is also generated in such a case that the gear was shifted from a low speed gear to a middle speed gear while the vehicle was accelerated rapidly, and subsequently the cruising of the vehicle with the middle speed gear at a speed lower than the reference speed level for an up-shift operation to the high speed gear has been continued for more than a predetermined period. Thus, an economic operation of the vehicle is enabled by an up-shift operation of the driver in response to this direction generated according to the method of the second embodiment.

Further, in the second embodiment of the invention, the reference speed level for the up-shift operation is lowered to the value $V_{045}$ when the cruising state of the vehicle is detected to be continued for more than the predetermined time period te. However, another value may be used as the reference speed level under this condition as far as the value is lower than the value $V_{047}$. For instance, this value may be changed in response to the temperature of the engine, in such a manner that the value, i.e. the reference speed level is lowered as the temperature of the engine raises. Moreover, this value may be made higher or lower than the value $V_{045}$ according to the surplus of the engine output power.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for directing an up-shift operation for a vehicle having an internal combustion engine and a manual transmission of at least three forward gear positions comprising the steps of:
   detecting whether an up-shift operation from a low speed gear to a medium speed gear is effected while the vehicle is accelerating rapidly;
   detecting whether or not a cruising state of the vehicle when the manual transmission is engaged at the medium speed gear has continued for more than a predetermined time period;
   determining a reference speed of up-shift operation, if said cruising state has continued for more than the predetermined time period, in such a manner that when it is detected that the up-shift operation from the low speed gear to the medium speed gear is effected while the vehicle is not accelerating rapidly, a level of said reference speed is determined to be lower than a level to be used in a case where the up-shift operation from the low speed gear to the medium speed gear is effected while the vehicle is accelerating rapidly; and
   generating a direction of up-shift operation when the vehicle speed exceeds said reference speed of up-shift operation.

2. The method as set forth in claim 1, further comprising:
   memorizing in a predetermined memory means a result of detection of said detecting whether an up-shift operation from a low speed gear to a medium speed gear is effected while the vehicle is accelerating rapidly; and
   resetting said result of detection when a low speed state or stopping of the vehicle is detected.

3. The method as set forth in claim 2, wherein a rapid acceleration of the vehicle is determined as a state in which a pressure within an intake manifold of said internal combustion engine is higher than a predetermined pressure level.

4. The method as set forth in claim 3, further comprising:
   detecting a deceleration of the vehicle by means of a variation of the speed of the vehicle; and
   stopping said generating of the direction of up-shift operation when the decceleration of the vehicle is detected.

5. The method as set forth in claim 2, further comprising:
   detecting a deceleration of the vehicle by means of a variation of the speed of the vehicle; and
   stopping said generating of the direction of up-shift operation when the deceleration of the vehicle is detected.

6. The method as set forth in claim 1, wherein a rapid acceleration of the vehicle is determined as a state in which a pressure within an intake manifold of said internal combustion engine is higher than a predetermined pressure level.

7. The method as set forth in claim 1, further comprising:
   detecting a deceleration of the vehicle by means of a variation of the speed of the vehicle; and stopping said generating of the direction of up-shift operation when the deceleration of the vehicle is detected.

8. The method as set forth in claim 1, wherein a level of said reference speed is set differently depending on an engine temperature.

9. A method for directing an up-shift operation for a vehicle having an internal combustion engine and a manual transmission of at least three forward gear positions comprising the steps of;
   detecting whether an up-shift operation from a low speed gear to a medium speed gear is effected while the vehicle is accelerating rapidly;
   detecting whether or not a cruising state of the vehicle when the manual transmission is engaged at the medium speed gear has continued for more than a predetermined time period;
   determining a reference speed of up-shift operation, if said cruising state has continued for more than the predetermined time period, in such a manner that when it is detected that the up-shift operation from the low speed gear to the medium speed gear is effected while the vehicle is not accelerating rapidly, a level of said reference speed is determined to be lower than a level to be used in a case wheren the up-shift operation from the low speed gear to the medium speed gear is effected while the vehicle is accelerating rapidly;
   generating a direction of up-shift operation when the vehicle speed exceeds said reference speed of up-shift operation; and
   setting a level of reference speed from the medium speed gear to the high speed gear lower than a predetermined level when it is detected that the cruising of the vehicle has been continued for more than the predetermined time period.

10. The method as set forth in claim 9, wherein said level of reference speed from the medium speed gear to the high speed gear when the cruising of the vehicle has been continued for more than the predetermined time period is made equal to a level of the reference speed from the medium speed gear to the high speed gear set when an up-shift operation from the low speed gear to the medium speed gear is effected while the vehicle is not accelerating rapidly.

11. The method as set forth in claim 10, further comprising:
   memorizing in a predetermined memory means a result of detection of said step for detecting whether an up-shift operation from a low speed gear to a medium speed gear is effected while the vehicle is accelerating rapidly; and
   resetting said result of detection when a low speed state or stopping of the vehicle is detected.

12. The method as set forth in claim 11, wherein a rapid acceleration of the vehicle is determined as a state in which a pressure within an intake manifold of said internal combustion engine is higher than a predetermined pressure level.

13. The method as set forth in claim 9, further comprising:
   memorizing in a predetermined memory means a result of detection of said detecting whether an up-shift operation from a low speed gear to a medium speed gear is effected while the vehicle is accelerating rapidly; and
   resetting said result of detection when a low speed state or stopping of the vehicle is detected.

14. The method as set forth in claim 13, wherein a rapid acceleration of the vehicle is determined as a state in which a pressure within an intake manifold of said internal combustion engine is higher than a predetermined pressure level.

15. The method as set forth in claim 9, wherein a rapid acceleration of the vehicle is determined as a state in which a pressure within an intake manifold of said internal combustion engine is higher than a predetermined pressure level.

16. The method as set forth in claim 15, wherein a rapid acceleration of the vehicle is determined as a state in which a pressure within an intake manifold of said internal combustion engine is higher than a predetermined pressure level.

* * * * *